(12) United States Patent
Pasquier et al.

(10) Patent No.: US 12,226,946 B2
(45) Date of Patent: Feb. 18, 2025

(54) DEVICE AND METHOD FOR TREATING HOLLOW BODIES

(71) Applicant: SIDEL PARTICIPATIONS, Octeville-sur-Mer (FR)

(72) Inventors: Hervé Pasquier, Octeville-sur-Mer (FR); Arnaud Delaunay, Octeville-sur-Mer (FR)

(73) Assignee: SIDEL PARTICIPATIONS

( * ) Notice: Subject to any disclaimer, the term of this patent is extended or adjusted under 35 U.S.C. 154(b) by 186 days.

(21) Appl. No.: 17/779,554

(22) PCT Filed: Nov. 27, 2020

(86) PCT No.: PCT/EP2020/083618
§ 371 (c)(1),
(2) Date: May 25, 2022

(87) PCT Pub. No.: WO2021/105348
PCT Pub. Date: Jun. 3, 2021

(65) Prior Publication Data
US 2023/0024197 A1  Jan. 26, 2023

(30) Foreign Application Priority Data
Nov. 29, 2019 (FR) ...................................... 1913437

(51) Int. Cl.
*B29C 49/78* (2006.01)
*B29C 49/42* (2006.01)
(Continued)

(52) U.S. Cl.
CPC ...... *B29C 49/783* (2013.01); *B29C 49/42828* (2022.05); *B29C 49/28* (2013.01); *B29K 2067/003* (2013.01); *B29L 2031/7158* (2013.01)

(58) Field of Classification Search
CPC .......... B29C 49/4289; B29C 49/42828; B29C 49/783; B29C 49/12; B29C 49/16;
(Continued)

(56) References Cited

U.S. PATENT DOCUMENTS

2009/0306830 A1  12/2009  Cummings
2013/0187304 A1   7/2013  Deau
2016/0332357 A1  11/2016  Gendre

FOREIGN PATENT DOCUMENTS

DE  102017114138 A1  12/2018
EP      3530431 A1   8/2019

OTHER PUBLICATIONS

International search report dated Feb. 9, 2021.

*Primary Examiner* — Monica A Huson
(74) *Attorney, Agent, or Firm* — Blake T. Hudson

(57) ABSTRACT

A device for treating hollow bodies, comprising at least a nozzle and a circuit for setting a pressurized airflow in circulation, having a valve and a first pressure sensor measuring a first pressure; a control distributor of said valve; a line connecting said distributor to said valve; a control unit with a time measurement component; wherein said device comprises a second pressure sensor situated along said line, measuring a second pressure, and wherein said control unit comprises means that are able to determine a differential between the measurement of the first pressure and the measurement of the second pressure as a function of time. The invention also relates to a corresponding treatment method.

20 Claims, 3 Drawing Sheets

(51) Int. Cl.
   *B29C 49/28*    (2006.01)
   *B29K 67/00*    (2006.01)
   *B29L 31/00*    (2006.01)
(58) Field of Classification Search
   CPC .... B29C 2949/0715; B29C 2049/2404; B29C 49/06; B29C 49/28; B29C 49/58; B29C 49/36; B29K 2067/003; B29L 2031/7158
   See application file for complete search history.

[Fig. 1]
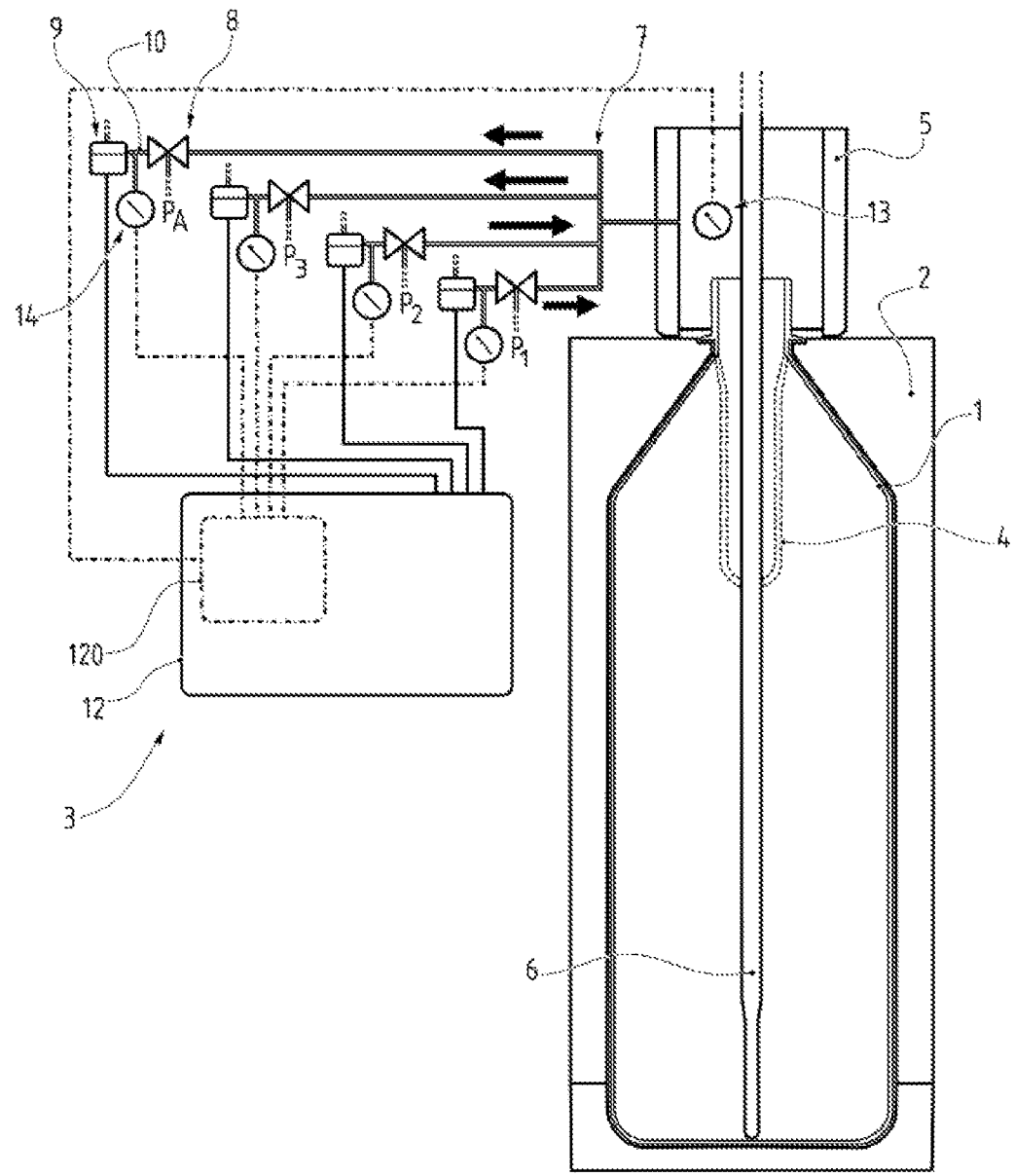

[Fig. 2]
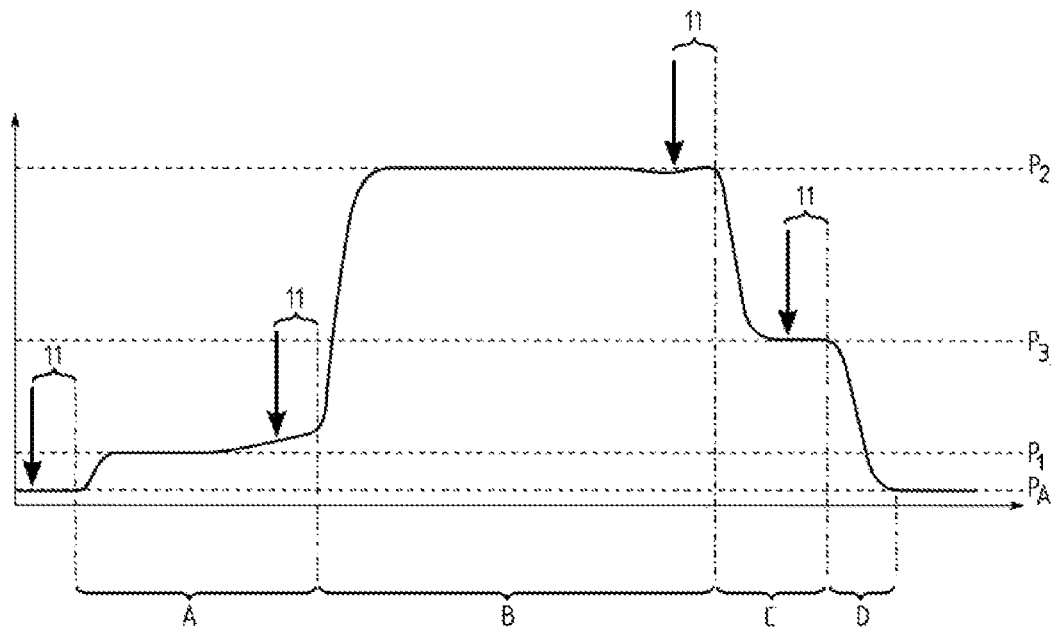
[Fig. 3]
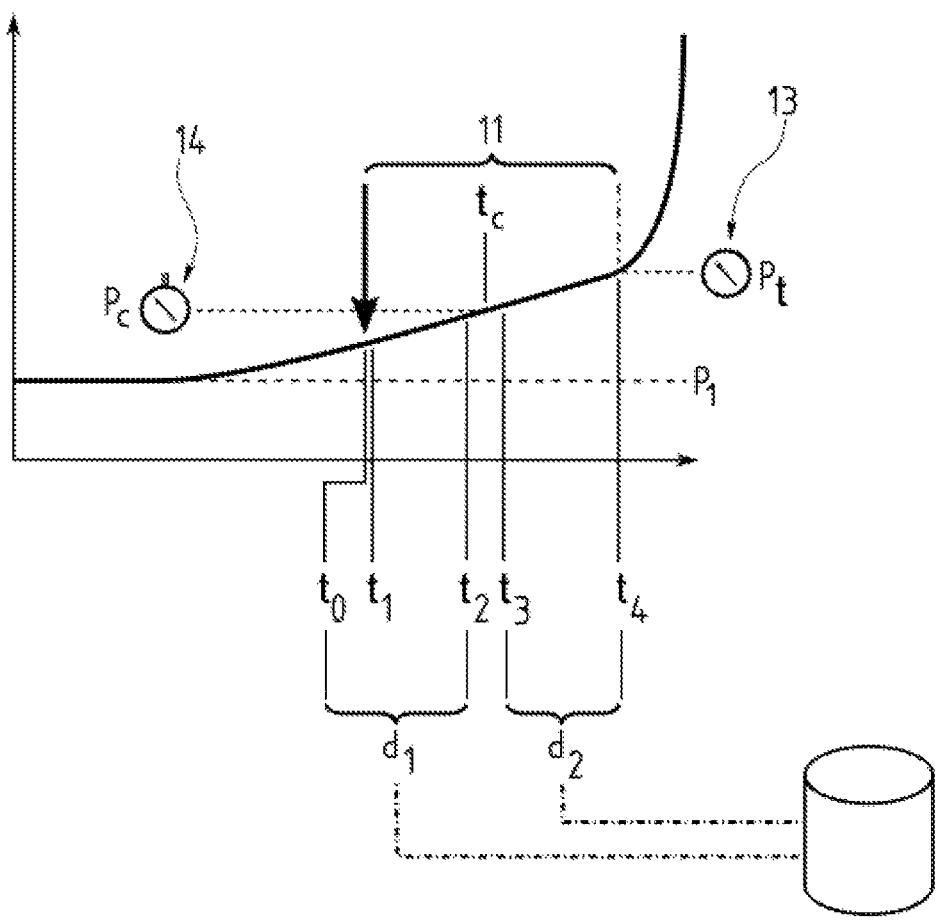

[Fig. 4]
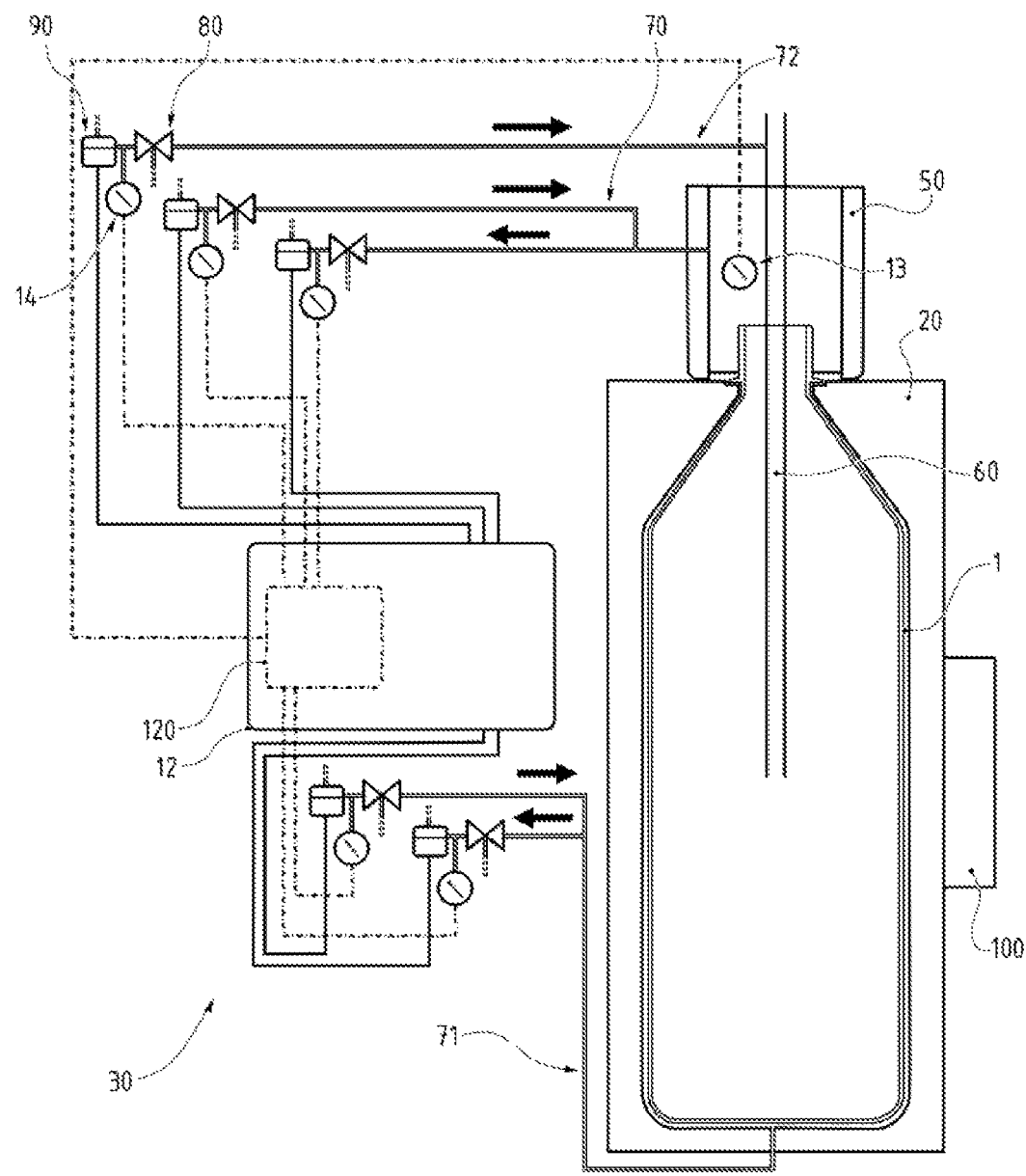

DEVICE AND METHOD FOR TREATING HOLLOW BODIES

The invention relates to the treatment of hollow bodies, in particular the shaping of containers made of plastics material by blow-molding from a blank or barrier coating carried out inside the container.

Preferably, but without this being limiting, the plastics material may be PET (for "polyethylene terephthalate").

In the rest of the description, the term "hollow body" should be understood as meaning either a container, a preform, or a blank.

Such a container takes the form of a bottle or a vial, made of plastics material, which is rigid or semi-rigid. This container is intended to act as a container for a fluid, a liquid, powders or granules, in particular of the agri-foodstuff or cosmetic type, without this list being exhaustive.

As is known, within an industrial line, the containers can undergo several different successive treatments, ranging from the manufacture of the container by a blow-molding or stretch-blow-molding operation to the packaging in batches of several grouped-together containers, passing in particular via the application of a barrier layer inside the container, filling, capping and labeling of individual products. Following these treatments, the products are said to be "finished".

The invention relates to the manufacturing step for shaping containers by blow-molding.

In general, this shaping of a container is achieved starting from a blank, which is either a preform or an intermediate container. The shaping makes use of a pressurized fluid which is blown into the blank, which has been heated in advance and positioned in a mold, in order to apply a plastic deformation until the desired container is obtained, depending on the shape of said mold. The container is therefore shaped by way of an operation of blow-molding, or stretch-blow-molding, a blank in a mold using a pressurized fluid, in particular air.

Such shaping takes place by means of a manufacturing machine that generally has a blank thermal conditioning unit, commonly referred to as an "oven", followed by a blow-molding unit provided with several blow-molding stations. What is more, each station is mounted so as to rotate at the periphery of a rotary carousel. Each station comprises a mold, into which each blank, coming from the oven, is introduced in order to undergo an operation converting it into a container during a blow-molding step, namely in particular during intermediate steps such as a pre-blow-molding step combined with a stretching step, a blow-molding step, a degassing step sometimes associated with a fluid recovery step.

The shaping of containers, such as bottles made of plastics material, by blow-molding blanks is well known. Before being blow-molded in order to be shaped into a container, the blank undergoes an appropriate heat treatment in a thermal conditioning oven. This heat treatment may be more or less sophisticated depending on the features of the container to be obtained. It consists in all cases in heating the plastics material of the blank to a temperature higher than its glass transition temperature in order to allow it to be deformed by blow-molding or by stretch-blow-molding.

The blank is then placed in a mold containing a cavity shaped with the impression of the container to be obtained and then, during a blow-molding conversion step, a blow-molding fluid, generally highly pressurized air, typically at a pressure of between 18 and 40 bar (1 bar being equivalent to 100 000 Pascal), is injected with the aid of a nozzle into the blank in order to inflate it and press the material against the interior walls of the mold, making it possible to obtain the container. Preferably, the conversion operation may include a step of stretching or elongating the blank with the aid of an elongation rod which is associated with the mold and made to slide toward the bottom of the blank and/or a pre-blow-molding step (typically at a pressure of between 8 and 15 bar).

After a certain time of contact of the plastics material with the mold, the container formed is degassed via a degassing step, with the pressure in the container being returned to atmospheric pressure before the final container is removed from the mold. In other methods, the degassing step is preceded by a step of recovering a part of the fluid contained in the container, in order to reinject it for further uses (in the machine itself or in the factory in which the machine is installed).

The operation of a blow-molding machine is relative complex, in particular on account of the large number of parameters to be taken into consideration that are likely to influence the quality of the container obtained.

It is known, for example as described in the document WO 2008/081107, to correlate singular points of measurements from an actual blow-molding curve with given parameters of the machine (in particular the flow rate or the pressure of pre-blow-molding), in order to apply corrections to the parameters depending on divergences observed at these singular points compared with a theoretical curve.

However, certain deviations can only be corrected to a certain extent, in particular by adapting certain operating parameters of certain components of the machine. Specifically, one or more deviations caused by deterioration or aging, be this premature or not, of one or more members, in particular mechanical or pneumatic members, that are present in the machine and are essential to the execution of the manufacturing method cannot be corrected, or can only be corrected to a limited extent, moreover using a regulation method. This is particularly the case for the deterioration or aging of certain components, such as the solenoid valves present in the machine or the deterioration by clogging of vent mufflers during degassing.

To this end, in the known blow-molding or stretch-blow-molding machines, each blow-molding station is arranged such that the interior of the hollow body made up of the blank, at the start of the sequence, and then by the formed container, at the end, can be placed in communication, in a first step, with a pre-blow-molding circuit, then, in a second step, with a blow-molding circuit, and then optionally with a circuit for recovering blow-molding fluid and finally with a degassing circuit (also known as an exhaust circuit) for returning the interior of the volume of the container to atmospheric pressure. The interior of the blank, or of the container, is placed in communication with the pre-blow-molding circuit, the blow-molding circuit, optionally the recovery circuit, and finally the degassing circuit with the aid of the same number of respective valves. Such valves are controlled electrically, and are commonly known as "solenoid valves". Exhaust mufflers can generally be associated with each exhaust circuit and make it possible to reduce the noise caused by relaxation when the interior of the container is returned to atmospheric pressure.

Consequently, as mentioned above, a material change at a solenoid valve causes a variation in its operation, which is detrimental to the execution of the blow-molding operation and to the containers manufactured thereby.

A known solution consists in detecting such malfunctioning of one of the solenoid valves. For this purpose, a known solution described in the document WO 2015/121557 consists in calculating an effective opening delay of a solenoid valve and comparing it with a theoretical delay, in order to output an alert if an admissible maximum difference is exceeded.

More specifically, the information is provided that deterioration or aging of at least one solenoid valve is too advanced to be able to be corrected by the regulation method, controlling the service life of the solenoid valves, in order to program maintenance operations so as to prevent any stoppage of the machine and, therefore, optimizing the efficiency thereof. To this end, during the manufacture of a container, after a blank has been introduced into a mold, the interior of the blank is placed in communication with at least one fluid circuit via a solenoid valve associated with said circuit. At a predetermined time, an opening order is sent to said solenoid valve which has a theoretical opening delay, that is to say a time that theoretically needs to pass between the opening order and the time at which the solenoid valve effectively opens. The idea is then to calculate the effective opening delay of said solenoid valve, that is to say the time that has passed between the opening order and an effective opening time of the solenoid valve. Once this effective delay has been calculated, a comparison makes it possible to determine if the difference is greater than an admissible maximum difference, and then to output an exceedance notification.

While such a solution makes it possible to detect malfunctioning of a solenoid valve, it is not entirely satisfactory, in particular as regards the location of the failure.

To this end, a solenoid valve comprises a valve controlled pneumatically by a distributor which is electrically controlled. The passage of a valve from a closed position to an open position, and vice versa, takes place under the action of the associated distributor, which receives a corresponding electric signal. The distributor then toggles to allow or prevent the placement in communication of a pressurized fluid toward said valve, said pressurized fluid circulating along a line connecting said distributor to said valve.

Consequently, a malfunction of a solenoid valve can originate from its distributor or from its valve.

The invention may relate to the step of depositing a coating in the form of a layer of a barrier-effect material inside the container.

In general, this deposition of a layer of a barrier-effect material inside the container is achieved by introducing a precursor gas under very low pressure into the container and then, at the same time, the precursor gas present inside the container is subjected to microwave electromagnetic excitation that is conducive to bringing about a plasma that causes the deposition of a barrier-effect material on the internal wall of the container.

Such a deposition takes place by means of a treatment machine comprising a plurality of identical treatment stations that are each intended to receive at least one container in a cavity and to place the cavity, and also the interior of the container, in communication with a source of pressure, in particular a vacuum source, to place the interior of the container in communication with a source of precursor gas and to excite this precursor gas with the aid of a microwave generator that is conducive to bringing about a plasma that causes the deposition of a barrier-effect material on the interior wall of the container.

By analogy with the shaping machine, the placements in communication that are carried out in the treatment machine in order to deposit the layer of barrier-effect material inside the container are likewise carried out with solenoid valves. Consequently, such solenoid valves have the same drawbacks as mentioned above. The aim of the invention is to remedy the drawbacks of the prior art by proposing to infer a failure of one or the other of the components of a solenoid valve, namely its valve or its distributor, from a measurement of the pressure between these components. In particular, the invention provides for the pressure in the pneumatic line connecting the distributor to its valve to be measured, making it possible to determine, in the case of a differential observed in relation to a setpoint, whether the failure is the result of a delay that has occurred at the distributor or at the valve.

To this end, the invention relates to a device for treating hollow bodies, comprising at least:
 a nozzle that opens into a hollow body placed inside a receptacle;
 at least one circuit and means for setting at least one pressurized airflow in circulation in at least one direction within said circuit;
 said at least one circuit comprising:
 at least one valve connected upstream to said nozzle and/or to said receptacle;
 at least one first pressure sensor in the region of said nozzle or in the region of said receptacle, measuring a first pressure;
 said device also comprising
 at least one control distributor for said at least one valve;
 a line connecting said distributor to said corresponding valve;
 at least one control unit controlling at least one of the different abovementioned components, said control unit comprising at least one time measurement component.

Such a treatment device comprises:
 at least one second pressure sensor situated along said line, measuring a second pressure inside said line;
 and said control unit comprises
 means that are able to determine at least one differential between the measurement of the first pressure and the measurement of the second pressure as a function of time.

According to additional, nonlimiting, features, said second sensor may be a sensor for detecting the presence of a pressure in said line.

Said second sensor may be a sensor for measuring the value of a pressure in said line.

Said control unit may comprise means that are able to compare said differential as a function of the time that has passed between a first time at which the first pressure is measured and a second time at which the second pressure is measured.

Said treatment device may comprise a mold for blow-molding said hollow body, which is in the form of a preform.

Said treatment device may comprise a cavity for receiving said hollow body, which is in the form of a container.

The invention also relates to a method for treating hollow bodies, in which at least:
 a hollow body is introduced into a receptacle closed by a nozzle;
 a pressurized airflow is set into circulation toward the inside of said nozzle and/or of said receptacle by the actuation of at least one valve, which is connected upstream to said nozzle or to said receptacle;
 the actuation of said at least one valve is controlled by an associated distributor, which is connected to said valve by a line;
 a first pressure is measured in the region of said nozzle.
 In such a treatment method, a second pressure is measured inside said line;
a differential between the measurement of the second pressure and the measurement of the first pressure is calculated;
depending on the differential, a response time of said distributor and a response time of said valve are determined.

According to additional, nonlimiting, features, such a treatment method may comprise one or another of the following steps:
the second pressure is measured by detecting the presence of a pressure inside said line.
the second pressure is measured by measuring the value of said second pressure.
if one of the response times is exceeded, an exceedance notification is output.
the exceedances of one of the response times are successively recorded;
a notification of the exceedances counted above a maximum threshold is output.

According to a first application, said treatment method may consist in a method for shaping a container by blow-molding from a blank placed in a mold.

According to another application, said treatment method may consist in a method for depositing a barrier-effect layer inside a container placed in a cavity.

Further features and advantages of the invention will become apparent from the following detailed description of nonlimiting embodiments of the invention, with reference to the appended figures, in which:

FIG. 1 schematically shows a view in median vertical section of an example of a mold for shaping containers by blow-molding a blank of the preform type;

FIG. 2 schematically shows an example of a blow-molding curve representative of the pressure over time during the shaping of a container;

FIG. 3 schematically shows a detail of the example blow-molding curve, at the end of a pre-blow-molding step, showing in particular different times taken into consideration; and FIG. 4 schematically shows a view in median vertical section of an example of a treatment cavity for the deposition of a barrier-effect material inside a container.

In the rest of the description, elements having an identical structure or analogous functions will be denoted by the same reference.

According to a first aspect, the invention relates to the shaping of a container 1 by blow-molding from a blank.

The blank and the container obtained by this shaping are made of plastics material, preferably PET.

Such shaping is carried out by means of a "blow-molding station". Several stations can be combined with one another, in particular at the periphery of a rotary carousel, thereby forming a blow-molding unit. Such a blow-molding unit is generally situated downstream of a heat treatment unit, commonly known as an "oven".

Each blow-molding station comprises a receptacle in the form of a mold 2, into which each blank, coming from the oven, is introduced in order to undergo an operation converting it into a container 1 during a blow-molding step, namely in particular during intermediate steps, such as a pre-blow-molding step combined with a stretching step, a blow-molding step, a degassing step sometimes associated with a fluid recovery step. The blow-molding step is carried out by means of a device 3 for shaping containers 1 by blow-molding from a blank.

To this end, such a blank may be a preform 4 or an intermediate container.

The preform 4 comprises a generally tubular and hollow body, closed by a generally hemispherical bottom, and open on the opposite side by a neck having the final shape of the neck of the container 1 to be obtained.

In FIG. 1, an example of a preform 4 is shown by way of dotted lines in a mold 2.

In order to ensure shaping by blow-molding, the device 3 comprises corresponding means that cooperate with the mold 2, receiving the blank.

Moreover, the shaping device 3 comprises at least one blow-molding nozzle 5, referred to as "nozzle" below.

Moreover, the nozzle 5 is mounted so as to be movable with respect to the blow-molding station from a high and retracted position, in which the blank can be introduced into the mold 2, to a low position covering the blank in a sealed manner with the mold 2, and vice versa.

Such a nozzle 5 therefore resembles a bell that covers the upper part of the mold 2, in particular the neck of the blank, in order to make it possible to feed the blow-molding air into the blank in order to press the plastics material against the interior walls of the mold 2.

The shaping device 3 may comprise an elongation rod 6 mounted so as to be movable vertically with respect to the nozzle 5, from a high and retracted position, to a low position in which the distal end of the rod 6 is in contact with the bottom of the mold 2, via intermediate positions, and vice versa. The rod 6 therefore slides with respect to said mold 2 and to the nozzle 5, longitudinally stretching the material of the blank under the effect of its descending vertical movement.

Note that intermediate positions during the descent of the rod 6 may correspond to the pre-blow-molding step.

FIG. 1 shows an elongation rod 6 in a low position.

In order to effect blow-molding inside the blank, the shaping device 3 comprises at least one circuit 7 and means (not shown) for setting at least one pressurized airflow in circulation in at least one direction within said circuit 7. Preferably, several airflows at different pressures are set in circulation at different times within said circuit 7, in an injection direction and an extraction direction.

Note that the means for setting into circulation may be of any type, in particular a fluid source connected to said circuit 7, in particular a pressurized fluid generated by a suitable means, such as a compressor or a pump. The source may comprise a reservoir that keeps the fluid at the desired pressure or is directly fed by said suitable means.

Said circuit 7 is connected to the nozzle 5 and allows, in one direction, the injection of an airflow, namely, in particular:
an airflow at low pressure or "pre-blow-molding pressure" P1, in particular between 5 and 13 bar (1 bar=100 000 Pascal), ensuring a pre-blow-molding step;
an airflow at high pressure or "blow-molding pressure" P2, in particular between 20 and 40 bar, ensuring the blow-molding step.

In the opposite direction, the circuit 7 makes it possible to extract, in the opposite direction, the pressurized air contained in the container 1 once it has been formed, namely, in particular:
during a recovery step, which makes it possible to recycle a part of the air from the high-pressure airflow, in particular from the blow-molding pressure P2 to a low threshold corresponding to a "recovery pressure" P3;

during a degassing step, which makes it possible to place the interior of the nozzle 5 and, as a result, of the container 1, in communication with the outside at atmospheric pressure PA.

The circuit 7 comprises portions dedicated to each setting into circulation of the pressurized airflow or airflows, with common portions, in particular at the connection to the nozzle 5.

The example in FIG. 1 shows a circuit 7 with a common portion connected to the nozzle 5 and provided with portions dedicated to the injection of the pre-blow-molding pressure P1 and the blow-molding pressure P2, and for the extraction down to the recovery pressure P3 and then down to atmospheric pressure PA. Arrows show the direction of circulation of the air along each of said dedicated portions.

Moreover, each of the dedicated portions of the circuit 7 is connected to a corresponding source.

In this regard, the means for setting into circulation make it possible in particular to manage all of the sources, and the setting of the airflow or airflows to the corresponding pressure. In particular, for the shaping device 3, the source or sources are supplied by compressors.

Furthermore, in order to allow or not to allow the passage of said at least one airflow, said at least one circuit 7 comprises at least one valve 8, connected upstream to said nozzle 5.

Preferably, the circuit 7 comprises as many valves 8 as there are different flows.

FIG. 1 shows four valves 8 corresponding to the dedicated pre-blow-molding, blow-molding, recovery and degassing portions.

In order to ensure the control of said at least one valve 8, the shaping device 3 provides suitable means for actuating each valve 8 from a closed position to an open position ensuring the circulation of the pressurized airflow, and vice versa.

To this end, said shaping device 3 also comprises at least one control distributor 9 for said at least one valve 8. In particular, each valve 8 is provided with a distributor 9 associated with its operation.

Note that the distributor 9 is activated electrically, in particular via a coil which, under the action of an electric current, toggles the distributor 9 into an open position or into a closed position, controlling in a reciprocal manner with respect to the control of the position of the associated valve 8.

Moreover, each distributor 9 controls its valve 8 pneumatically, by transmission of a pneumatic command, in the form of setting a pressurized fluid into circulation. It is this pressurized fluid which, when the distributor 9 is activated electrically and toggles into the open position, controls the actuation of the valve 8 toward its open position. When the distributor 9 is deactivated, returning into the closed position, the pressurized fluid no longer circulates and the valve 8 returns to the closed position. Operation the other way around can also be envisioned.

A distributor 9 is therefore an electro-pneumatic controller of the associated valve 8. Thus, a distributor 9 and a valve 8 then form an assembly known as a "solenoid valve". Such a solenoid valve is preferably of the "all or nothing" type, but may optionally be of the proportional type.

Moreover, in order to allow the circulation of the pressurized fluid between the distributor 9 and the valve 8, the shaping device 3 comprises a line 10 connecting said distributor 9 to said corresponding valve 8. Such a line 10 is inherent to the operation of the valve 8, and is therefore situated within each solenoid valve and outside the circuit 7 for the circulation of the pressurized airflow or airflows provided for blow-molding the container 1.

Moreover, a solenoid valve has an effective opening or closing delay 11, that is to say the time that passes between, for the one part, a first time $t_0$ at which an order is sent to the distributor 9 in the form of an electric signal, activating or deactivating said distributor 9, and, for the other part, the following time $t_4$ at which the valve 8 is completely open or closed. This effective delay 11 tends to change depending on certain parameters such as the number of cycles to which the solenoid valve is subjected, the wear on certain components thereof over time, but also on account of environmental conditions.

Immediately after a solenoid valve has been manufactured, it has a theoretical effective delay 11 which can be controlled in advance, in particular during the running-in of the installation. This effective delay 11 is therefore a known constant which is admitted as a function of certain tolerances.

With reference to FIG. 2, which shows an example of a theoretical curve during the shaping of a container 1 by blow-molding within the shaping device 3 according to the invention, a plurality of steps follow one another, namely:

a pre-blow-molding step A: a first, pre-blow-molding solenoid valve is controlled by sending, at a first time $t_0$, an order for activation of its distributor 9, which controls the opening of its associated valve 8, which opens at a time $t_4$ after an effective delay 11: the pressure in the circuit 7 then passes from atmospheric pressure PA to the pre-blow-molding pressure P1;

a blow-molding step B: a second, blow-molding solenoid valve is controlled by sending, at another first time $t_0$, another order for activation of its distributor 9, which controls the opening of its associated valve 8, which opens at a time $t_4$ after another effective delay 11: the pressure in the circuit 7 then passes from the pre-blow-molding pressure P1 to the blow-molding pressure P2;

a recovery step C: a third, recovery solenoid valve is controlled by sending, at yet another first time $t_0$, yet another order for activation of its distributor 9, which controls the opening of its associated valve 8, which opens at a time $t_4$ after yet another effective delay 11: the pressure in the circuit 7 then passes from the blow-molding pressure P2 to the low threshold of the recovery pressure P3;

a degassing step D: a fourth, degassing solenoid valve is controlled by sending, at yet another first time $t_0$, yet another order for activation of its distributor 9, which controls the opening of its associated valve 8, which opens at a time $t_4$ after yet another effective delay 11: the pressure in the circuit 7 then passes from the recovery pressure to atmospheric pressure PA.

Note that before or after each control of the opening or closing of the abovementioned solenoid valves, it is possible to respectively control the closing or opening of the previously actuated solenoid valve.

Moreover, the shaping device 3 comprises at least one control unit 12 controlling at least one of the different abovementioned components. In other words, the control unit 12 controls the opening and closing of each of the solenoid valves, preferably the activation and deactivation of the associated distributor 9.

Such a control unit 12 can be automated, in particular in the form of a computer terminal on which software suitable for controlling the shaping device 3 is run. The control unit 12 can be entirely or partially remote from or installed on the shaping device 3.

In sum, the operation of each solenoid valve is similar and has an effective delay 11 that is inherent thereto. This effective delay 11 depends, for the one part, on the period of time for the activation or deactivation of its distributor 9 and, for the other part, on the period of time for the opening or closing of its valve 8. In other words, the effective delay 11 of a solenoid valve depends on the response time $d_1$ of the distributor 9 and on the response time $d_2$ of the valve 8.

In the event of a malfunction of one of these elements, it is therefore necessary to determine whether it is the distributor 9 or the valve 8 that has malfunctioned.

The invention envisions determining which element of a solenoid valve is defective, by measuring the pressures, for the one part, at the outlet of the blow-molding circuit 7 in the region of the nozzle 5 and, for the other part, directly within a solenoid valve, between the distributor 9 and the valve 8, at the line 10.

Moreover, on the basis of these measurements of the pressures of the pressurized airflow and of the pressurized fluid, it is possible to calculate a differential and to compare it with known values, previously recorded, which are provided either theoretically or are based on adjustments previously made. Consequently, it is possible to infer the response times $d_1, d_2$ for the distributor 9 and the valve 8. Thus, if one of these response times $d_1, d_2$ is exceeded, it is possible to determine whether it is the distributor 9 or the valve 8 that is defective.

In other words, after the first time $t_0$ of sending the activation signal to the distributor 9 and after the latter delivers the pressurized flow for actuating its valve 8, the time that passes between the measurement of a pressure $P_c$ inside the line 10 and the measurement of a pressure $P_1$ in the region of the nozzle 5, namely connected to the interior of the blank or of the container 1, is determined.

Moreover, this time is determined as a function of the step being undertaken, in particular with respect to the corresponding pressure, namely the pre-blow-molding pressure $P_1$, the blow-molding pressure $P_2$, optionally the lower threshold of the recovery pressure $P_3$ or atmospheric pressure $P_A$.

To this end, within the shaping device 3 according to the invention, the circuit 7 comprises at least one first pressure sensor 13 in the region of said nozzle 5, measuring a first pressure $P_t$. This first sensor 13 may also be positioned in the region of the common part of the circuit 7, communicating directly with the interior of the nozzle 5, or within said nozzle 5, in order to measure the pressure $P_t$ therein. Such a first sensor 13 therefore makes it possible to detect the presence of a first pressure $P_t$ inside the nozzle 5, in particular to measure the value thereof at a given time. This first sensor 13 is therefore positioned and able to measure the pressure inside the nozzle 5.

Advantageously, the shaping device 3 comprises at least one second pressure sensor 14 situated along said line 10. This second sensor 14 measures a second pressure $P_c$ inside the line 10.

Moreover, the second sensor 14 can be positioned along said line 10, at the outlet of the distributor 9 or at the inlet of the associated valve 8. This second sensor 14 is therefore positioned and able to measure the pressure inside the line 10.

According to different embodiments, the second sensor 14 can measure either the presence of a second pressure $P_c$, in which case it is a sensor for detecting the presence of a pressure in said line 10, or, combined or not combined therewith, the value of the second pressure $P_c$, in which case it is a sensor for measuring the value of a pressure in said line 10.

Note that the second sensor 13 can be similar to the second sensor 14, preferably a sensor for measuring the value of a pressure.

Consequently, by measuring the second pressure $P_c$ between the distributor 9 and the valve 8, it is possible to obtain an intermediate reference, in order to determine if these two elements are operating correctly or if one of them is defective.

To this end, the control unit 12 comprises means 120 for comparing or that are able to compare at least one differential between the measurement of the first pressure $P_t$ and the measurement of the second pressure $P_c$. Such comparison means 120 therefore make it possible to infer, for each solenoid valve, a differential between the first pressure $P_t$ in the nozzle 5 following the opening or closing of the valve 8, and the second pressure $P_c$ in the line 10 following the activation or deactivation of the distributor 9.

In particular, the measurement of the first pressure $P_t$ by the first sensor 13 makes it possible to take into consideration a fluctuation in the value of the pressure inside the nozzle 5. In sum, the first sensor 13 can continuously measure the pressure in the region of the nozzle 5 and a comparison is carried out during the measurement of a change in the first pressure $P_t$, following a measurement of a change in the second pressure $P_c$ that occurred just before.

This comparison is carried out as a function of time. In sum, the amount of time that passes between the detection of the second pressure $P_c$ in the line 10 and the detection of the first pressure $P_t$ in the nozzle 5 is checked, in particular a change in this first pressure $P_t$.

According to a preferred embodiment, the comparison means 120 then comprise means for the temporal calculation of said at least one differential between a time $t_4$ at which the first pressure $P_t$ is measured and a time $t_c$ at which the second pressure $P_c$ is measured.

Already, it is found that the time $t_4$ at which the first pressure $P_t$ is measured corresponds to the end of opening or closing of the valve 8, from which moment the pressurized air circulates inside the circuit 7 toward the nozzle 5 at the desired pressure PA, P1, P2, P3 depending on the corresponding step A, B, C, D.

However, the time $t_c$ then makes it possible to know when the distributor 9 is entirely activated or deactivated and, as a result, to know when the pressurized fluid circulates inside the line 10 in order to start to control said valve 8. Thus, since the first time $t_0$ for the output of the signal sent for the activation or deactivation of said distributor 9 is known, it is possible to infer a time $t_2$ corresponding to the end of the activation or deactivation of the distributor 9.

Note that the time $t_1$ may correspond to the receiving of the signal by said distributor 9, making it possible to take into consideration any known and fixed latency, depending on the communication means employed between the control unit 12 and the distributor 9. For example if the control unit 12 is centralized and remote, given the very small times, it is possible to take into consideration the transmission time of the signal between the first time $t_0$, at which it is output, and the time $t_1$, at which it is received by the distributor 9.

Thus, it is possible to obtain a response time $d_1$ of the distributor 9 between the first time $t_0$ and the time $t_2$, or between the time $t_1$ and the time $t_2$.

In addition, the time $t_c$ also makes it possible to know when the valve 8 starts to be controlled on account of the fact that the line 10 is pressurized. Thus, it is possible to infer a time $t_3$ corresponding to the start of the control of opening or closing the valve 8. In other words, at the time $t_3$, the pressurized fluid in the line 10 starts to actuate the movement of the valve 8 to open or close it.

It is thus possible to obtain a response time $d_2$ of the valve 8, between the time $t_3$ and the time $t_4$.

As mentioned above, the time $t_4$ then corresponds to the end of the opening or closing movement of the valve 8.

FIG. 3 shows an example of such a breakdown of the effective delay 11 of a solenoid valve, highlighting the different times $t_0$, $t_1$, $t_2$, $t_3$, $t_4$, $t_c$, making it possible to infer the response times $d_1$, $d_2$ of the distributor 9 and of the valve 8.

Note that, within the meaning of the present invention, all the times in each step, in particular the times $t_0$, $t_1$, $t_2$, $t_3$, $t_4$, $t_c$ for each solenoid valve, may correspond to angles or to angular values related to a cycle of shaping a container by blow-molding, in particular given that the blow-molding machine rotates.

Furthermore, given the dimensions of the line 10 and the pressure of the pressurized fluid circulating therein under the action of the distributor 9, the times $t_2$, $t_3$, $t_c$ may be substantially equivalent. Consequently, the time $t_c$ at which the second pressure $P_c$ is measured in the line 10 makes it possible to determine the time $t_2$ at which the distributor 9 is totally activated or deactivated and the time $t_3$ at which the valve 8 starts to open or close. A fluctuation of this time $t_c$ then makes it possible to know if the distributor 9 or the valve 8 has an extended, or shortened, response time $d_1$, $d_2$, causing a lag in its normal and known operating delay.

For this reason, if one of the response times $d_1$, $d_2$, is exceeded, an exceedance notification is output. Such an exceedance can be checked by way of the comparison means 120 of the control unit 12.

In particular, a comparison of the response times $d_1$, $d_2$ can be carried out in relation to prerecorded values, in the form of setpoints. The exceedance may be observed from a fluctuation in the response times $d_1$, $d_2$ above a threshold around one of the prerecorded values.

Moreover, such recording of the setpoint values may be carried out within the control unit 12, as shown schematically in FIG. 3.

According to another embodiment, a comparison can also be made directly with respect to the time $t_c$, with respect to a prerecorded value, in order to infer the response times $d_1$, $d_2$ therefrom, with regard in particular to the times $t_0$, $t_4$. Consequently, if an exceedance is found, the output of said notification makes it possible to alert an operator. The notification has the aim of indicating to the operator that a solenoid valve is no longer capable of ensuring normal operation, that is to say of opening (and, a priori, of closing) in a period of time, without having an effect on the quality of the future container 1 or on the proper overall operation of the blow-molding machine. Moreover, such a notification can therefore indicate which component of a solenoid valve is defective, namely the distributor 9 or the associated valve 8. According to a second aspect, the invention relates to the treatment of a hollow body by the deposition of a layer of a barrier-effect material inside a container 1.

The container 1 is made of plastics material, preferably of PET.

Such a deposition is carried out by means of a "unit for depositing a layer of a barrier-effect material". Several stations can be combined with one another, in particular at the periphery of a rotary carousel, thereby forming a "unit for depositing a layer of a barrier-effect material". In the rest of the description, the term "deposition station" will be used instead of the term "unit for depositing a layer of a barrier-effect material" and the term "deposition unit" will be used instead of the term "unit for depositing a layer of a barrier-effect material".

Each deposition station comprises a receptacle in the form of a cavity 20, into which each container 1 is introduced in order to under an operation of deposition of the layer of barrier-effect material on the internal wall of the container 1.

In FIG. 4, an example of a container 1 is shown in a cavity 20.

In order to ensure the deposition, a deposition device 30 comprises corresponding means that cooperate with the cavity 20 receiving the container 1.

Moreover, the deposition device 30 comprises at least one nozzle 50.

Moreover, the nozzle 50 is mounted so as to be movable with respect to the deposition station from a high and retracted position, in which the container 1 can be introduced into the cavity 20, to a low position covering the container in a sealed manner with the cavity 20, and vice versa.

Such a nozzle 50 therefore resembles a bell that covers the upper part of the cavity 20, in order to make it possible in particular to remove the air from the container 1. The deposition device 30 comprises an injector 60 mounted so as to be movable vertically with respect to the nozzle 50, from a high and retracted position to a low position in which the distal end of the injector 60 is not in contact with the bottom of the container.

This injector 60 is a hollow rod through which a precursor fluid in a gaseous state circulates. This precursor gas is chosen from the alkanes, the alkenes, the alkynes, the aromatics, or a combination of certain ones of these. This injector 60 makes it possible to inject a necessary quantity of precursor gas into the container in order to create a plasma.

In order to effect the deposition inside the container 1, the deposition device 30 comprises at least one circuit 70 and means (not shown) for setting at least one pressurized airflow in circulation in at least one direction within said circuit 70. Preferably, several airflows at different pressures are set in circulation at different times within said circuit 70, in an extraction direction and an injection direction. In particular, for the deposition device 30, the source or sources are supplied by pumps.

Said circuit 70 is connected to the nozzle 50 and allows, in one direction, the extraction of the airflow, inside the container, and said circuit 70 is also connected to the interior of the cavity 20 in order to create a vacuum inside the container and also inside the cavity 20.

Then, before the container is removed from the cavity, it is necessary to place the interior of the container and the interior of the cavity at atmospheric pressure.

The example in FIG. 4 shows two circuits 70, 71. The circuit 70 is connected to the nozzle 50 and is provided with a common portion and dedicated portions for extracting the air to create the vacuum and to return the interior of the container 1 to atmospheric pressure. The circuit 71 is connected to the cavity 20 and is provided with a common portion and dedicated portions for creating a negative pressure and for returning the interior of said cavity 20 to atmospheric pressure.

A separate circuit 72 may be dedicated to conveying the precursor gas. This circuit 72 is then connected to the injector 60.

Arrows show the directions of circulation of the air along each of said dedicated portions.

Moreover, each of the dedicated portions of the circuit 70, 71, 72 is connected to a corresponding source.

In this regard, the means for setting in circulation make it possible in particular to manage all of the sources, and the setting of the airflow or airflows to the corresponding pressure.

Furthermore, in order to allow or not to allow the passage of said at least one airflow, said at least one circuit 70, 71, 72 comprises at least one valve 80, connected upstream to said nozzle 50 or the receptacle 20 or the injector 60. In addition, the injector 60 is likewise connected to a source of precursor gas in order to allow the injection of the latter into the container 1 once the vacuum has been created therein. The example in FIG. 4 shows a microwave generator 100 contiguous with the cavity 20.

Once the precursor gas has been introduced into the container 1, the microwave generator 100 generates an electromagnetic wave conducive to bringing about a plasma that causes the deposition of a barrier-effect material on the interior wall of the container 1.

In order to ensure the control of said at least one valve 80, the deposition device 30 provides suitable means that make it possible to actuate each valve 80 from a closed position to an open position ensuring the circulation of the airflow, and vice versa.

To this end, said deposition device 30 also comprises at least one control distributor 90 for said at least one valve 80. In particular, each valve 80 is provided with a distributor 90 associated with its operation.

Note that the distributor 90 is activated electrically, in particular via a coil which, under the action of an electric current, toggles the distributor 90 into an open position or into a closed position, controlling in a reciprocal manner with respect to the control of the position of the associated valve 80.

Moreover, each distributor 90 controls its valve 80 pneumatically, by transmission of a pneumatic command, in the form of setting a pressurized fluid into circulation. It is this pressurized fluid which, when the distributor 90 is electrically activated and toggles into the open position, controls the actuation of the valve 80 into its open position. When the distributor 90 is deactivated, returning into the closed position, the pressurized fluid no longer circulates and the valve 80 returns to the closed position. Operation the other way around can also be envisioned.

A distributor 90 is therefore an electro-pneumatic controller of the associated valve 80. Thus, a distributor 90 and a valve 80 then form an assembly known as a "solenoid valve". Such a solenoid valve is preferably of the "all or nothing" type, but may optionally be of the proportional type.

Moreover, in order to allow the circulation of the pressurized fluid between the distributor 90 and the valve 80, the deposition device 30 comprises a line 10 connecting said distributor 90 to said corresponding valve 80. Such a line 10 is inherent to the operation of the valve 80, and is therefore situated within each solenoid valve and outside the circuit 70 for the circulation of the pressurized airflow or airflows in the container 1.

By analogy, the solenoid valves operate in the same way whether for the treatment of hollow bodies for the shaping of a container 1 from a blank or for the deposition of a barrier coating carried out inside the container 1 by plasma under low pressure.

The invention also relates to a method for treating hollow bodies.

First of all, the invention may relate to a method for forming hollow bodies in the form of a container 1 by blow-molding from a blank, in particular from a preform 4.

Such a shaping method is preferably suitable for the implementation of the treatment device 3 applied for shaping according to the invention, as described above.

Such a shaping method comprises the following steps, without this being limiting. First of all, a blank is introduced into a mold 2 closed by a blow-molding nozzle 5. Once the blank has been positioned in the mold 2, a pressurized airflow is set in circulation toward the interior of said nozzle 5 by actuation of at least one valve 8, connected upstream to said nozzle 5.

To this end, the actuation of said at least one valve 8 is controlled by an associated distributor 9. Such a distributor is connected to said valve by a line 10. It is therefore in the interior of this line 10 that a pressurized fluid circulates, which causes the valve 8 to open.

Moreover, such a valve 8 may return to the closed position in the absence of pressurized fluid within said line 10, if the distributor 9 is deactivated.

As mentioned above, for the one part, pressurized air is set in circulation toward the nozzle 5 in order to carry out blow-molding via a circuit 7. It is in this circuit that each valve 8 is positioned, in order to supply the nozzle 5 with pressurized air. For the other part, the valve 8 is controlled by its associated distributor 9, via the line 10 and the setting into circulation of a pressurized fluid by said distributor 9: said line 10 then being separate from the circuit 7.

Moreover, a first pressure $P_t$ is measured in the region of said nozzle 5.

This measurement of the first pressure $P_t$ makes it possible to know the pressure inside the nozzle 5 at any time.

Advantageously, a second pressure $P_c$ is measured inside said line 10.

According to different embodiments, it is possible to measure said second pressure $P_c$ either by detecting the presence of a pressure inside said circuit 10 or by measuring the value of said second pressure $P_c$.

Once the second pressure $P_c$ has been measured, a differential between the measurement of the second pressure $P_c$ and the measurement of the first pressure $P_t$ is calculated.

Next, depending on said differential, a response time $d_1$ of said distributor 9 and a response time $d_2$ of said valve 8 are determined.

In a subsidiary manner, it is possible to calculate the corresponding times $t_0$, $t_1$, $t_2$, $t_3$, $t_4$ in order to apply an item of time data in order to determine said response times $d_1$, $d_2$. It is thus these response times $d_1$, $d_2$ that it is possible to check, in order to see whether one or the other exceeds by an admissible maximum difference, in particular with regard to the required operating conditions.

Preferably, if one of the response times $d_1$, $d_2$ exceeds, an exceedance notification is output. This notification may alert an operator, for the one part, that failure of a solenoid valve has been found and, for the other part, whether it is the distributor 9 or the valve 8 which exhibits the fault. The operator could thus provide a maintenance operation in order to change one and/or the other of the defective components.

In order to avoid any unnecessary maintenance, in the event of exceedance that originates from a one-off difference and is not representative of deterioration of a solenoid valve, the invention envisions determining a recurrence of the exceedance of one of the response times $d_1$, $d_2$ for each solenoid valve. In sum, the invention envisions checking that a malfunction arises several times in a solenoid valve, in particular in its distributor 9 or its valve 8, before a notification is output.

To this end, any exceedances are recorded on each shaping cycle so as only to output a notification starting from a maximum threshold. Such recording can take place very quickly, on account of the very high production rates, especially in the case of a rotary blow-molding installation provided with a carousel.

Thus, in the method according to the invention, the exceedances of one of the response times $d_1$, $d_2$ are counted successively, and then a notification of the counted exceedances is output above a maximum threshold.

In a similar and corresponding manner, the invention may relate to a method for depositing a barrier-effect layer in a container 1 placed in a cavity 20.

Such a deposition method is preferably suitable for the implementation of the treatment device 30 applied to the deposition according to the invention, as described above.

The device and the treatment method according to the invention therefore make it possible, by way of the measurement of a second pressure directly within a solenoid valve, by positioning a second sensor 14 between its distributor 9, 90 and its valve 8, 80, to check the proper operation thereof, in particular by comparing the response times $d_1$, $d_2$ of its components with setpoint values.

The invention claimed is:

1. A device for treating hollowing bodies, comprising:
   a nozzle that opens into a hollow body placed inside a receptacle;
   at least one circuit and means for setting at least one pressurized airflow in circulation in at least one direction within said circuit;
   said at least one circuit comprising:
      at least one valve connected upstream to said nozzle and/or to said receptacle;
      at least one first pressure sensor in the region of said nozzle or in the region of said receptacle, measuring a first pressure;
   said treatment device also comprising:
      at least one control distributor for said at least one valve;
      a line connecting said distributor to said corresponding valve;
      at least one control unit controlling at least one of the different abovementioned components, said control unit comprising at least one time measurement component;
   wherein said device comprises:
      at least one second pressure sensor situated along said line, measuring a second pressure inside said line; and
   wherein said control unit comprises
      means that are able to determine at least one differential between the measurement of the first pressure and the measurement of the second pressure as a function of time.

2. The treatment device as claimed in claim 1, wherein said at least one second pressure sensor is a sensor for detecting the presence of a pressure in said line.

3. The treatment device as claimed in claim 1, wherein said at least one second pressure sensor is a sensor for measuring the value of a pressure in said line.

4. The treatment device as claimed in claim 1, wherein said control unit comprises means that are able to compare said differential as a function of the time that has passed between a first time at which the first pressure is measured and a second time at which the second pressure is measured.

5. The treatment device as claimed in claim 1, further comprising a mold for blow-molding said hollow body, which is in the form of a preform.

6. The treatment device as claimed in claim 1, further comprising a cavity for receiving said hollow body, which is in the form of a container.

7. A method for treating hollow bodies, comprising:
   introducing a hollow body into a receptacle closed by a nozzle;
   setting a pressurized airflow into circulation toward the inside of said nozzle and/or of said receptacle by actuation of at least one valve, which is connected upstream to said nozzle or to said receptacle;
   controlling the actuation of said at least one valve by an associated distributor, which is connected to said valve by a line;
   measuring a first pressure in the region of said nozzle; wherein
   a second pressure is measured inside said line;
   a differential between the measurement of the second pressure and the measurement of the first pressure is calculated;
   depending on the differential, a response time of said distributor and a response time of said valve are determined.

8. The treatment method as claimed in claim 7, wherein the second pressure is measured by detecting the presence of a pressure inside said line.

9. The treatment method as claimed in claim 7, wherein the second pressure is measured by measuring the value of said second pressure.

10. The treatment method as claimed in claim 7, wherein, if one of the response times is exceeded, an exceedance notification is output.

11. The treatment method as claimed in claim 10, wherein
    the exceedances of one of the response times are successively recorded;
    a notification of the exceedances counted above a maximum threshold is output.

12. The treatment method as claimed in claim 7, which consists in a method for shaping a container by blow-molding from a blank placed in a mold.

13. The treatment method as claimed in claim 7, which consists in a method for depositing a barrier-effect layer inside a container placed in a cavity.

14. The treatment device as claimed in claim 2, wherein said at least one second pressure sensor is a sensor for measuring the value of a pressure in said line.

15. The treatment device as claimed in claim 2, wherein said control unit comprises means that are able to compare said differential as a function of the time that has passed between a first time at which the first pressure is measured and a second time at which the second pressure is measured.

16. The treatment device as claimed in claim 2, further comprising a mold for blow-molding said hollow body, which is in the form of a preform.

17. The treatment device as claimed in claim 2, further comprising a cavity for receiving said hollow body, which is in the form of a container.

18. The treatment method as claimed in claim 8, wherein the second pressure is measured by measuring the value of said second pressure.

19. The treatment method as claimed in claim 8, wherein, if one of the response times is exceeded, an exceedance notification is output.

20. The treatment method as claimed in claim 8, which consists in a method for shaping a container by blow-molding from a blank placed in a mold.

* * * * *